United States Patent
Dieter et al.

(10) Patent No.: US 6,951,523 B1
(45) Date of Patent: Oct. 4, 2005

(54) MECHANICAL VARIABLE REVERSIBLE TRANSMISSION

(76) Inventors: Walter J. Dieter, 416 Jeffries Ave. Space 15, Monrovia, CA (US) 91016; Tina T Dieter-Messineo, 25112 Bellota, Mission Viejo, CA (US) 92692

( * ) Notice: Subject to any disclaimer, the term of this patent is extended or adjusted under 35 U.S.C. 154(b) by 64 days.

(21) Appl. No.: 10/678,447

(22) Filed: Oct. 6, 2003

(51) Int. Cl.$^7$ .............................................. F16H 37/02
(52) U.S. Cl. .................................................... 475/211
(58) Field of Search ................................ 475/211, 212

(56) References Cited

U.S. PATENT DOCUMENTS

| | | | |
|---|---|---|---|
| 2,623,410 A | 12/1952 | Billey | |
| 3,340,749 A * | 9/1967 | Friedrich et al. | 475/211 |
| 3,354,748 A * | 11/1967 | Chapman | 475/211 |
| 3,375,738 A | 4/1968 | Love | |
| 3,481,221 A * | 12/1969 | Gaskins | 475/211 |
| 3,715,928 A | 2/1973 | Case et al. | |
| 4,393,731 A | 7/1983 | Croswhite et al. | |
| 4,673,377 A | 6/1987 | Akutagawa | |
| 5,853,343 A | 12/1998 | Eggert et al. | |

* cited by examiner

Primary Examiner—Dirk Wright

(57) ABSTRACT

A mechanical variable reversible transmission includes a support frame, an elongate drive shaft and an elongate idler shaft both supported by the frame. A drive mechanism operably connected to the drive and idler shafts, respectively, and has an input for causing same to rotate in a first direction about the respective longitudinal axis thereof. A mechanism for governing the rotational direction of the drive shaft and is operably connected to the drive mechanism for causing the drive shaft to accelerate in the first direction and to thereby cause the idler shaft to rotate at a relative speed. The governing mechanism cooperates with the drive mechanism for causing the drive shaft to reach an idle stage and thereafter cause the drive shaft to rotate in a second direction after same accelerates from the idle stage.

18 Claims, 6 Drawing Sheets

MECHANICAL VARIABLE REVERSIBLE TRANSMISSION

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a transmission and, more particularly, to a mechanical variable reversible transmission eliminating the need for a clutch to change gears between forward, neutral and reverse positions.

2. Prior Art

It has heretofore been proposed to use a belt-pulley type transmission for automobile driving systems. In such driving systems, the transmission is required to have an ability of transmitting the engine rotation in a reverse direction as well as in a forward direction. For the purpose, the transmission is provided with a reverse drive gear mechanism.

For example, U.S. Pat. No. 4,673,377 to Akutagawa discloses a belt-pulley type transmission having a forward-reverse selecting gear mechanism provided between the power clutch and the input member of the belt-pulley mechanism. In the proposed transmission, however, problems have been encountered in that the direction of rotation of the input member of the belt-pulley mechanism is changed between the forward and reverse drive modes. Such change in the direction of rotation of the input member causes a change in the direction of the torque which is being transmitted by the belt so that the life of the belt is shortened to an undesirable extent.

Unfortunately, conventional gear-changing transmissions are expensive, complicated and inefficient in design. The requirement to constantly shift gears also creates "gaps" when accelerating. Thus, the operation of conventional transmissions do not provide smooth acceleration and require the need to manually shift gears between forward, neutral and reverse positions. Another shortcoming of conventional prior art is that they require a significant number of mechanical parts to transfer engine power to usable torque and, therefore, such prior art require more maintenance.

BRIEF SUMMARY OF THE INVENTION

In view of the foregoing background, it is therefore an object of the present invention to provide mechanical reversible transmission, which overcomes the shortcomings of related prior art. These and other objects, features, and advantages of the invention are provided by a reversible transmission including a support frame including top and bottom surfaces and an elongate drive shaft supported by the frame. The drive shaft has input and output end portions extending outwardly from the top and bottom surfaces and also has a longitudinal axis.

The present invention further includes an elongate idler shaft supported by the frame and spaced from the drive shaft. The idler shaft has a longitudinal axis extending substantially parallel to the longitudinal axis of the drive shaft and has one end portion extending outwardly from the top surface of the frame. The present invention further includes a drive mechanism operably connected to the drive and idler shafts, respectively, and has an input for causing same to rotate in a first direction about the respective longitudinal axis thereof. The drive mechanism includes a plurality of pulleys and a belt operably connected to same for assisting to control rotational acceleration of the drive and idler shafts. The drive mechanism further includes an idler drive gear operably connected to the idler shaft.

The present invention further includes a mechanism for governing the rotational direction of the drive shaft and is operably connected to the drive mechanism for causing the drive shaft to accelerate in the first direction and to thereby cause the idler shaft to rotate at a relative speed. The governing mechanism cooperates with the drive mechanism for causing the drive shaft to reach an idle stage and thereafter cause the drive shaft to rotate in a second direction after same accelerates from the idle stage. The present invention further includes a sprocket operably connected to the output end portion of the drive shaft and rotates in the same direction thereof.

The governing mechanism preferably includes a stub shaft, a main drive gear operably attached thereto and to the idler drive gear, a planetary drive gear mounted to the stub shaft for cooperating with the main drive gear, and a drive gear connected to the drive shaft and inter-geared with the planetary drive gear. The governing mechanism may further include an output drive gear connected to the drive shaft adjacent the output end portion thereof. The output drive is preferably connected to the drive gear and the planetary drive gear and the sprocket.

The governing mechanism may further include a support plate and a shoulder bolt for connecting same to the stub shaft. The present invention may further include a plurality of bearings engageable with the drive and idler shafts and for assisting to maintain same at substantially stable positions during operating conditions.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
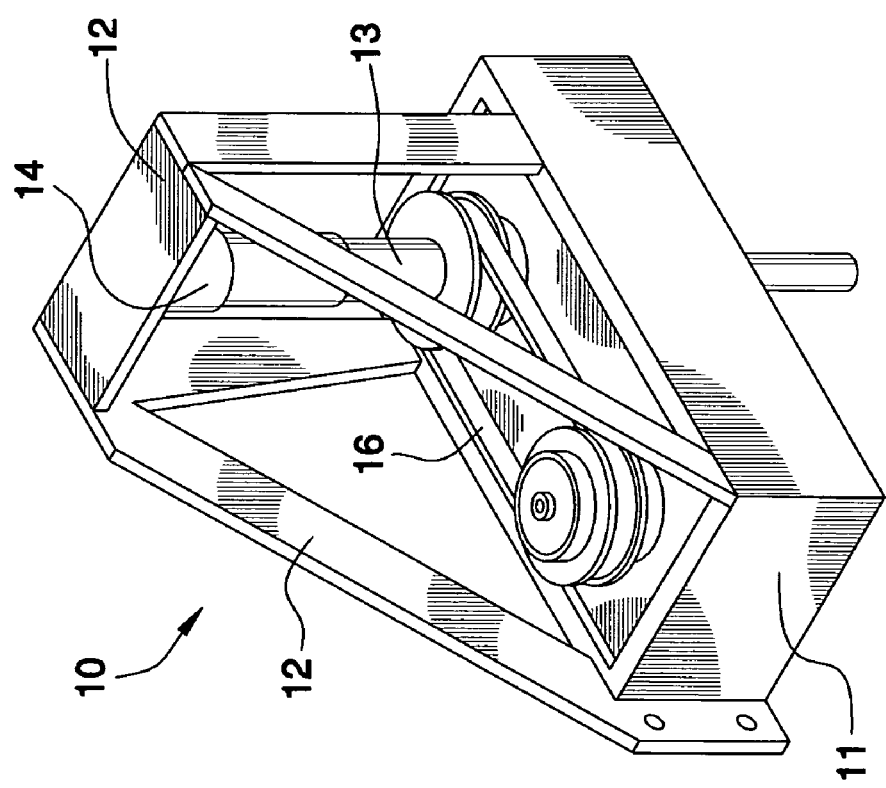
FIG. 1 is a perspective view showing a mechanical reversible transmission, in accordance with the present invention.
Figure 2:
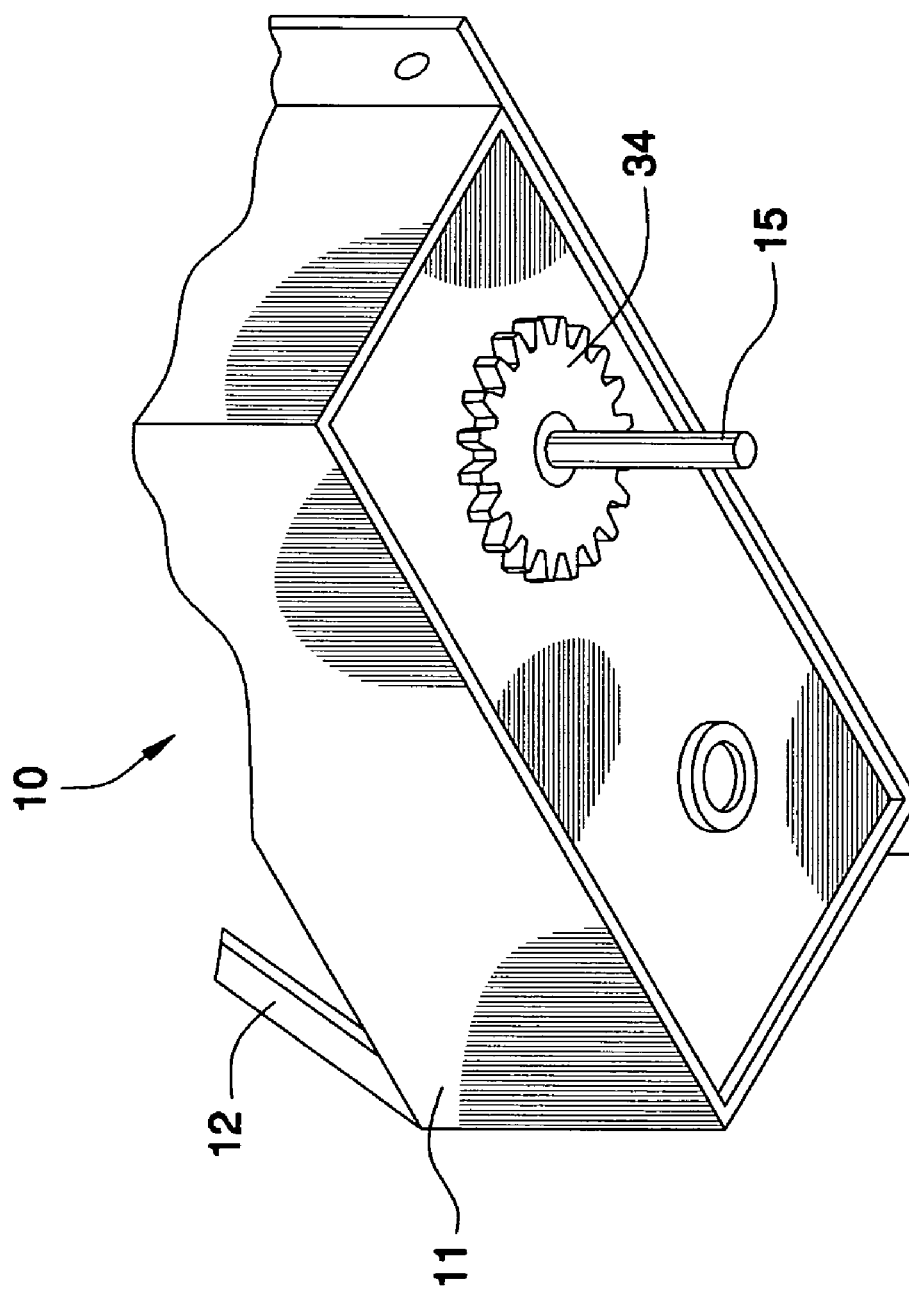
FIG. 2 is a perspective view showing a bottom portion of FIG. 1.

The apparatus of this invention is referred to generally in FIGS. 1 and 2 by the reference numeral 10 and is intended to provide a reversible drive-type transmission for providing motion to a vehicle. Advantageously, the apparatus 10 effectively eliminates the need to employ traditional gear-changing transmissions when transmitting power from an engine to a live axle. It should be understood that the apparatus 10 may be adapted for use in boats, lawn mowers, heavy construction equipment and other similar vehicles.

The apparatus 10 includes a support frame 11 having substantially planar sidewalls defining a substantially rectangular housing. A plurality of elongate members 12 extend upwardly from outer corner portions of the support frame 11 to further define the housing of the apparatus 10. An elongate drive shaft 13 passes through the support frame 11 and extends outwardly therefrom. In particular, the drive shaft 13 has input and output end portions 14, 15 disposed above and below the top and bottom surfaces of the support frame, respectively.

Figure 3:
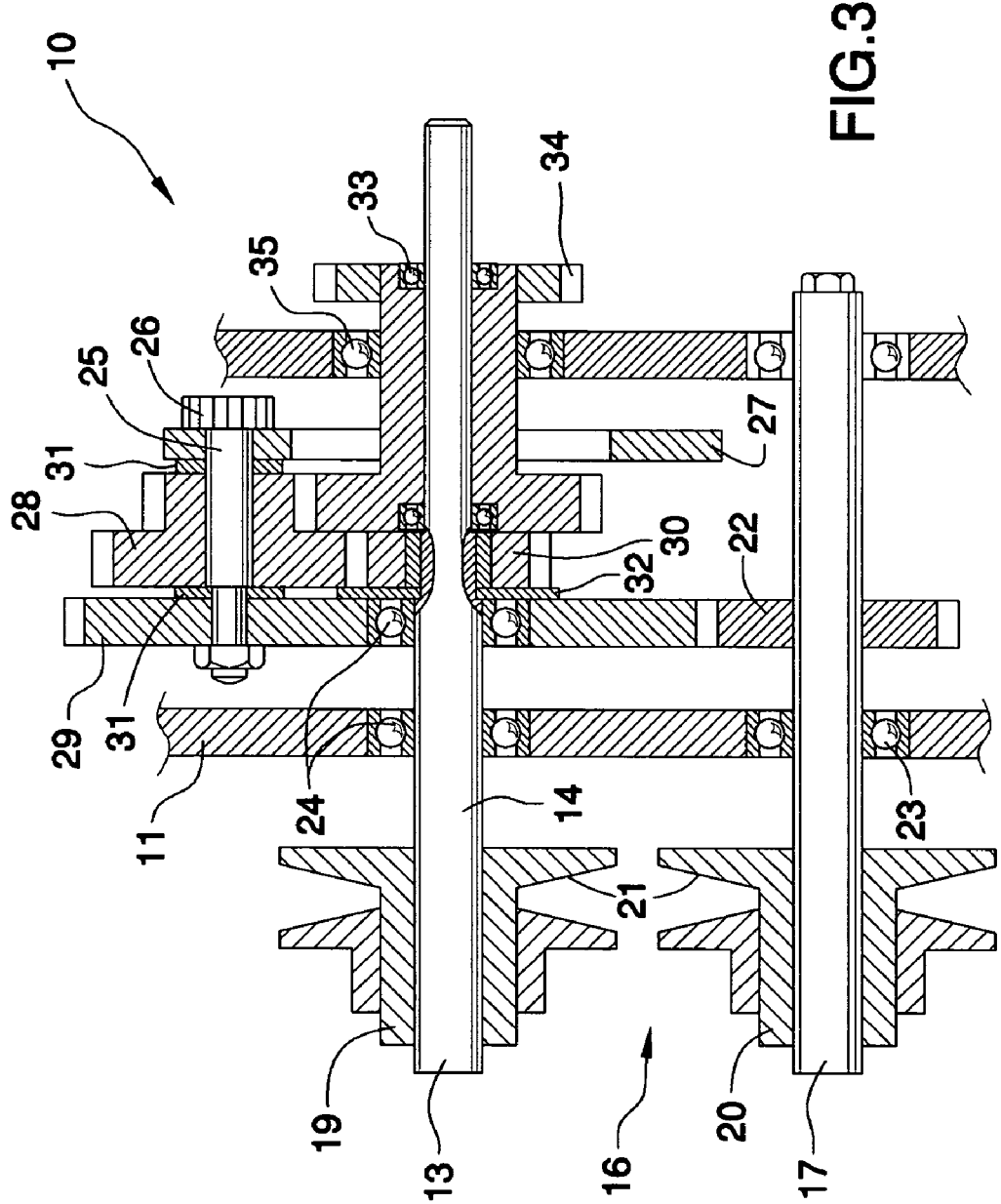
FIG. 3 is an enlarged cross-sectional view of FIG. 1.

Now referring to FIG. 3, a cross-sectional view of the apparatus 10 is shown wherein the drive shaft 13 is connected to a variable pulley system or drive mechanism 16 adjacent to its input end portion 14. An idler shaft 17 is spaced from the drive shaft 13 and extends substantially parallel thereto. Such an idler shaft 17 is operably connected to the drive shaft via the drive mechanism 16 and a governing mechanism 18. The idler shaft 17 has input and output end portions wherein the input end portion extends outwardly from the top surface of the support frame 11. Such an input end portion is also connected to the drive mechanism 16.

In particular, the variable pulleys 19, 20 are operably connected to each other via a conventional V-belt 21, as readily known to a person or ordinary skill in the art. Accordingly, the drive mechanism 16 is banded by the V-belt 21 for transmitting motion therebetween and to change the direction and point of application of a pulling force and the applied force thereof. The drive mechanism 16 further includes an idler drive gear 22 connected to an output end portion of the idler shaft 17, via a conventional bolt. A plurality of bearings 23 are engageable around an outer surface of the idler shaft 17 and along a length thereof so that same can be maintained in a substantially stable position.

A governing mechanism 18 is operably connected to the drive shaft 13 and the drive mechanism 16. Similar to the idler shaft 17, a plurality of bearings 24 are spaced along the length of the drive shaft 13 and engage the outer surface thereof for assisting to maintain same in a stable position within the support frame 11.

The governing mechanism 18 includes a stub shaft 25 spaced from the drive shaft 13 and extending substantially parallel thereto. A shoulder bolt 26 connects the stub shaft 25 to a support plate 27. Such a support plate is connected to both the stub and drive shafts 25, 13, respectively. A conventional planetary drive gear 28 is mounted for rotation upon the stub shaft 25 and is inter-geared with a conventional drive gear 30 connected thereto generally midway of the drive shaft 13. Such a planetary drive gear 28 cooperates with the drive gear 30 and assists in determining a relative speed and a direction of travel of the drive shaft 13.

A main drive gear 29 is connected to an end portion of the stub shaft 25 and is spaced from the planetary gear 28 by a plurality of spacers 31. The main drive gear 29 is also connected to the drive shaft 13 and the stub shaft 17. A second plurality of spacers 32 help maintain the drive gear 30 and main drive 29 separated and at stable positions within the support frame 11.

An output drive 33 is slide mounted upon the output end portion of the drive shaft 13 and is operably inter-geared with the planetary drive gear 28. The output end portion of the drive shaft 13 is mounted within the support frame 11 and engaged with the drive shaft 13 via a plurality of bearings 35. A conventional sprocket is connected to the output end portion of the drive shaft 13 an rotates in sync therewith.

Figure 4:
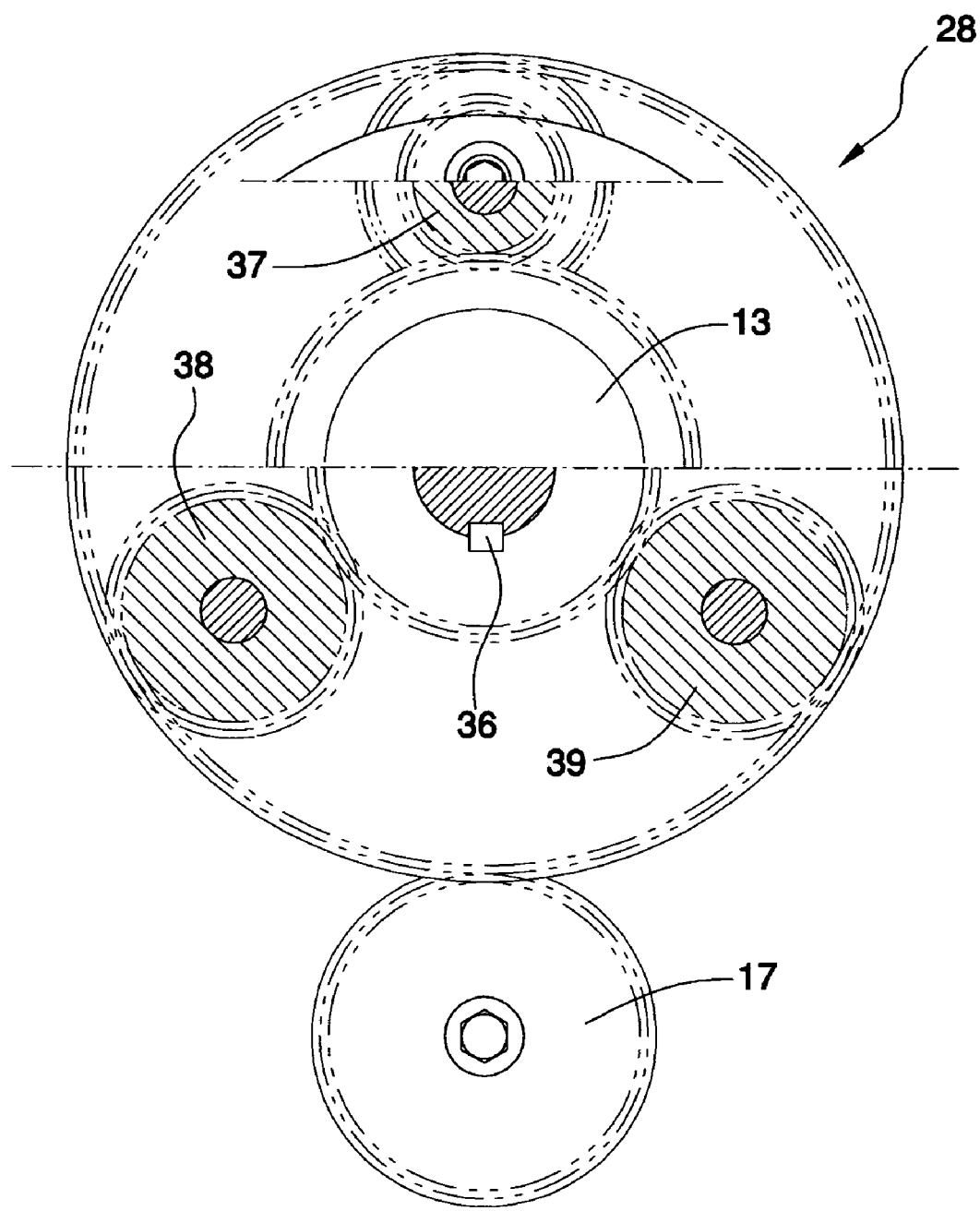
FIG. 4 is a cross-sectional view of the drive and idlers shafts with the planetary drive gear positioned thereabout.

Now referring to FIG. 4, a cross-sectional view of the planetary drive gear 28 is shown as including a plurality of gear portions 37–39 spaced apart adjacent to a perimeter thereof. The drive shaft 13 extends through the center portion of the planetary drive gear 28 and is provided with a conventional key 36 adjacent the output end portion thereof. Such a key 36 cooperates with the drive gear 33 and sprocket 34 and serves as a wedge for selectively preventing rotational movement thereof, in a manner well known in the art.

Figure 5:
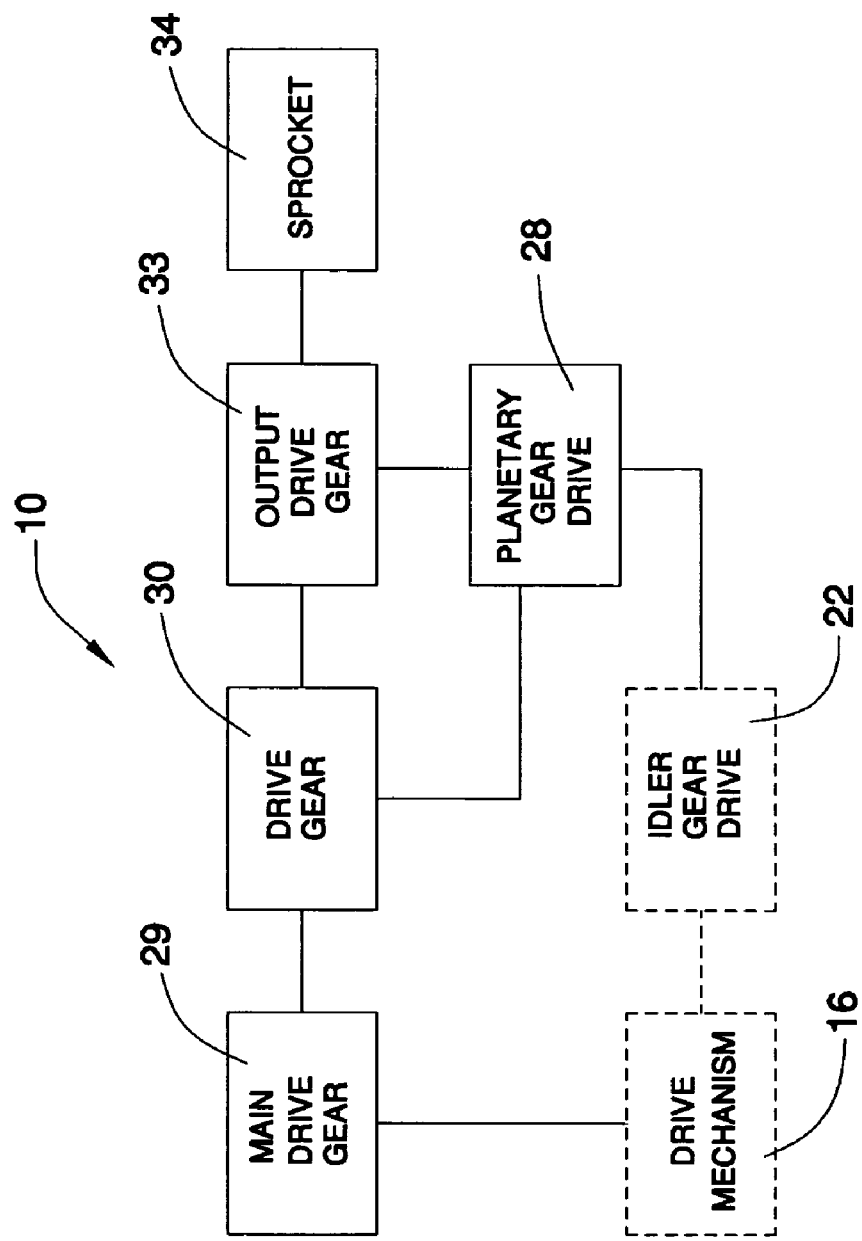
FIG. 5 is a schematic diagram of the relationship between the gear members when the present invention is operating in a first direction.

Now referring to FIG. 5, a schematic diagram of the apparatus 10 is shown wherein the variable pulley system or drive mechanism 16 is connected to main drive and idler drive gears 29, 22, respectively. The idler drive gear 22 is operably connected to the main drive gear 29, which cooperates with the drive gear 30. Such a drive gear is operably connected to the output and planetary drive gears 33, 28, respectively, as clearly shown. The output drive gear 33 is operably connected to a conventional sprocket 34 including a plurality of teeth and connected adjacent to the output end portion of the drive shaft 13.

Figure 6:
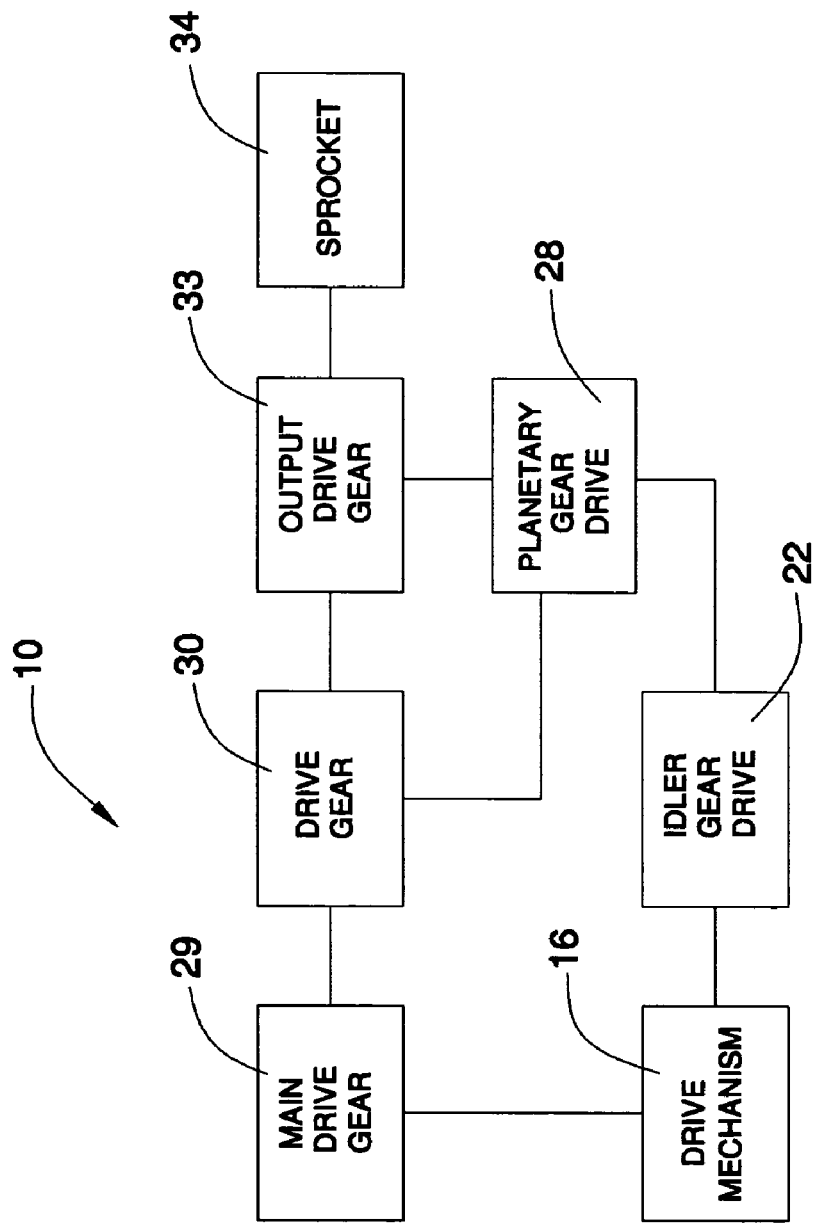
FIG. 6 is a schematic diagram of the relationship between the gear members when the present invention is operating in a second direction.

Notably, when the apparatus 10 is moving in a forward or first direction, the drive mechanism or variable pulley system 16 is engaged and, therefore, the idler drive gear 22 along with its associated idler shaft 17 are moving some direction of drive. In such an operating condition, the V-belt 21 is engaged. As shown in FIG. 6, when the apparatus 10 is moving in a reverse or second direction, the drive mechanism 16 and the idler drive gear 22 are engaged so that the associated idler shaft 17 and V-belt 21 are in an operating or active mode.

In particular, upon rotation of the drive shaft 13, the idler shaft 17 rotates at a relative speed and is governed by the regulation of the variable pulleys or drive mechanism 16. Upon rotation of the idler shaft 17, its associated drive gear 22 rotates to thereby effects the rotation of the main drive gear 29 to thereby cause rotation of the planetary drive gear 28 and drive gear 30 connected thereto. The rotation of drive gear 30 causes rotation of the drive shaft 13 at its output end portion. The variation of the drive shaft 13 rotation, induced by the variable pulleys 19, 20, causes a rotation of the output end portion in a first direction that is controlled or governed by the relationship between the various portions of the planetary gear 28.

Accordingly, the variation of the drive shaft 13 rotation causes the output end portion thereof to rotate in the first direction. As the idler shaft 17 is accelerated in its rotation, or the variable pulleys 19, 20 are adjusted, the output end portion of the drive output reaches an idle stage and idler shaft 17 does not rotate. Upon further rotational acceleration of the drive 33, the output end portion thereof is caused to rotate in an opposite direction. Advantageously, the momentum of the vehicle powered by the apparatus 10 can be changed between forward, neutral and reverse directions without needing to change gears via a clutch.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A reversible transmission comprising:
   a support frame including top and bottom surfaces;
   an elongate drive shaft being supported by said frame, said drive shaft having input and output end portions extending outwardly from said top and bottom surfaces, said drive shaft having a longitudinal axis, said drive shaft including a wedge adjacent to said output end portions;
   an elongate idler shaft supported by said frame and spaced subjacent to said drive shaft, said idler shaft having a longitudinal axis extending substantially parallel to the longitudinal axis of said drive shaft, said idler shaft having one end portion extending outwardly from said top surface of said frame;
   a drive mechanism being operably connected to said drive and idler shafts respectively and having an input for causing same to rotate in a first direction about said respective longitudinal axis thereof;
   means for governing the rotational direction of said drive shaft and being operably connected to said drive mechanism and for causing said drive shaft to accelerate in the first direction to thereby cause said idler shaft to rotate at a relative speed, said governing means cooperating with said drive mechanism for causing said drive shaft to reach an idle stage and thereafter causing said drive shaft to rotate in a second direction after same accelerates from the idle stage; and
   a sprocket operably connected to said output end portion of said drive shaft and rotating in the same direction thereof;
   wherein said wedge cooperates with said sprocket and said drive mechanism for selectively preventing rotational movement of said drive shaft when the direction of rotation is changed.

2. The transmission of claim 1, wherein said drive mechanism comprises a plurality of pulleys and a belt operably connected to same and for assisting to control rotational acceleration of said drive and idler shafts.

3. The transmission of claim 1, wherein said drive mechanism further comprises an idler drive gear operably connected to said idler shaft.

4. The transmission of claim 3, wherein said governing means comprises:
   a stub shaft vertically spaced from said drive shaft and disposed parallel to said drive shaft;
   a main drive gear operably attached thereto and to said idler drive gear;
   a planetary drive gear mounted to said stub shaft and for cooperating with said main drive gear;
   a first plurality of spacers directly interfitted between said main drive gear and said planetary drive gear;
   a drive gear connected to said drive shaft and inter-geared with said planetary drive gear; and
   a second plurality of spacers directly interfitted between said main drive gear and said drive gear.

5. The transmission of claim 4, wherein said governing means further comprises:
   an output drive gear connected to said drive shaft adjacent said output end portion thereof, said output drive being connected to said drive gear and said planetary drive gear and said sprocket.

6. The transmission of claim 4, wherein said governing means further comprises:
   a support plate and a shoulder bolt for connecting same to said stub shaft.

7. The transmission of claim 1, further comprising a plurality of bearings engageable with said drive and idler shafts and for assisting to maintain same at substantially stable positions during operating conditions.

8. A reversible transmission comprising:
   a support frame including top and bottom surfaces;
   an elongate drive shaft being supported by said frame, said drive shaft having input and output end portions extending outwardly from said top and bottom surfaces, said drive shaft having a longitudinal axis;
   an elongate idler shaft supported by said frame and spaced from said drive shaft, said idler shaft having a longitudinal axis extending substantially parallel to the longitudinal axis of said drive shaft, said idler shaft having one end portion extending outwardly from said top surface of said frame;
   a drive mechanism being operably connected to said drive and idler shafts respectively and having an input for causing same to rotate in a first direction about said respective longitudinal axis thereof, said drive mechanism includes a plurality of pulleys and a belt operably connected to same and for assisting to control rotational acceleration of said drive and idler shafts;
   means for governing the rotational direction of said drive shaft and being operably connected to said drive mechanism and for causing said drive shaft to accelerate in the first direction to thereby cause said idler shaft to rotate at a relative speed, said governing means cooperating with said drive mechanism for causing said drive shaft to reach an idle stage and thereafter causing said drive shaft to rotate in a second direction after same accelerates from the idle stage; and
   a sprocket operably connected to said output end portion of said drive shaft and rotating in the same direction thereof.

9. The transmission of claim 8, wherein said drive mechanism further comprises an idler drive gear operably connected to said idler shaft.

10. The transmission of claim 9, wherein said governing means comprises:
    a stub shaft;
    a main drive gear operably attached thereto and to said idler drive gear;
    a planetary drive gear mounted to said stub shaft and for cooperating with said main drive gear; and
    a drive gear connected to said drive shaft and inter-geared with said planetary drive gear.

11. The transmission of claim 10, wherein said governing means further comprises:
    an output drive gear connected to said drive shaft adjacent said output end portion thereof, said output drive being connected to said drive gear and said planetary drive gear and said sprocket.

12. The transmission of claim 10, wherein said governing means further comprises:
   a support plate and a shoulder bolt for connecting same to said stub shaft.

13. The transmission of claim 8, further comprising a plurality of bearings engageable with said drive and idler shafts and for assisting to maintain same at substantially stable positions during operating conditions.

14. A reversible transmission comprising:
   a support frame including top and bottom surfaces;
   an elongate drive shaft being supported by said frame, said drive shaft having input and output end portions extending outwardly from said top and bottom surfaces, said drive shaft having a longitudinal axis;
   an elongate idler shaft supported by said frame and spaced from said drive shaft, said idler shaft having a longitudinal axis extending substantially parallel to the longitudinal axis of said drive shaft, said idler shaft having one end portion extending outwardly from said top surface of said frame;
   a drive mechanism being operably connected to said drive and idler shafts respectively and having an input for causing same to rotate in a first direction about said respective longitudinal axis thereof, said drive mechanism includes a plurality of pulleys and a belt operably connected to same and for assisting to control rotational acceleration of said drive and idler shafts, said drive mechanism further includes an idler drive gear operably connected to said idler shaft;
   means for governing the rotational direction of said drive shaft and being operably connected to said drive mechanism and for causing said drive shaft to accelerate in the first direction to thereby cause said idler shaft to rotate at a relative speed, said governing means cooperating with said drive mechanism for causing said drive shaft to reach an idle stage and thereafter causing said drive shaft to rotate in a second direction after same accelerates from the idle stage; and
   a sprocket operably connected to said output end portion of said drive shaft and rotating in the same direction thereof.

15. The transmission of claim 14, wherein said governing means comprises:
   a stub shaft;
   a main drive gear operably attached thereto and to said idler drive gear;
   a planetary drive gear mounted to said stub shaft and for cooperating with said main drive gear; and
   a drive gear connected to said drive shaft and inter-geared with said planetary drive gear.

16. The transmission of claim 15, wherein said governing means further comprises:
   an output drive gear connected to said drive shaft adjacent said output end portion thereof, said output drive being connected to said drive gear and said planetary drive gear and said sprocket.

17. The transmission of claim 15, wherein said governing means further comprises:
   a support plate and a shoulder bolt for connecting same to said stub shaft.

18. The transmission of claim 14, further comprising a plurality of bearings engageable with said drive and idler shafts and for assisting to maintain same at substantially stable positions during operating conditions.

* * * * *